United States Patent [19]

Cook et al.

[11] 4,099,838
[45] Jul. 11, 1978

[54] REFLECTIVE SHEET MATERIAL

[75] Inventors: Jack E. Cook, Saint Paul; Terry R. Bailey, Cottage Grove, both of Minn.

[73] Assignee: Minnesota Mining and Manufacturing Company, Saint Paul, Minn.

[21] Appl. No.: 693,299

[22] Filed: Jun. 7, 1976

[51] Int. Cl.² .............................................. G02B 5/28
[52] U.S. Cl. ..................................... 350/105; 40/582; 350/102; 350/109
[58] Field of Search ............... 350/105, 103, 104, 165, 350/166, 109, 163, 168, 164, 102, 320, 318; 40/130 B; 356/71

[56] References Cited

U.S. PATENT DOCUMENTS

| 3,154,872 | 11/1964 | Nordgen ............................. 350/105 |
| 3,700,305 | 10/1972 | Bingham ............................ 350/166 |
| 3,801,183 | 4/1974 | Sevelin et al. ..................... 350/109 |
| 3,858,977 | 1/1975 | Baird et al. ........................ 350/166 |

*Primary Examiner*—John K. Corbin
*Assistant Examiner*—B. W. de los Reyes
*Attorney, Agent, or Firm*—Cruzan Alexander; Donald M. Sell; Roger R. Tamte

[57] ABSTRACT

A new sheet material carries specially viewable reflective legends provided by a dielectric mirror. The mirror is patterned so that the reflectivity from the mirror carries a pattern of contrasting colors. In some embodiments the mirror is incorporated into retroreflective sheet materials, and in other embodiments in specularly reflective sheet materials.

27 Claims, 8 Drawing Figures

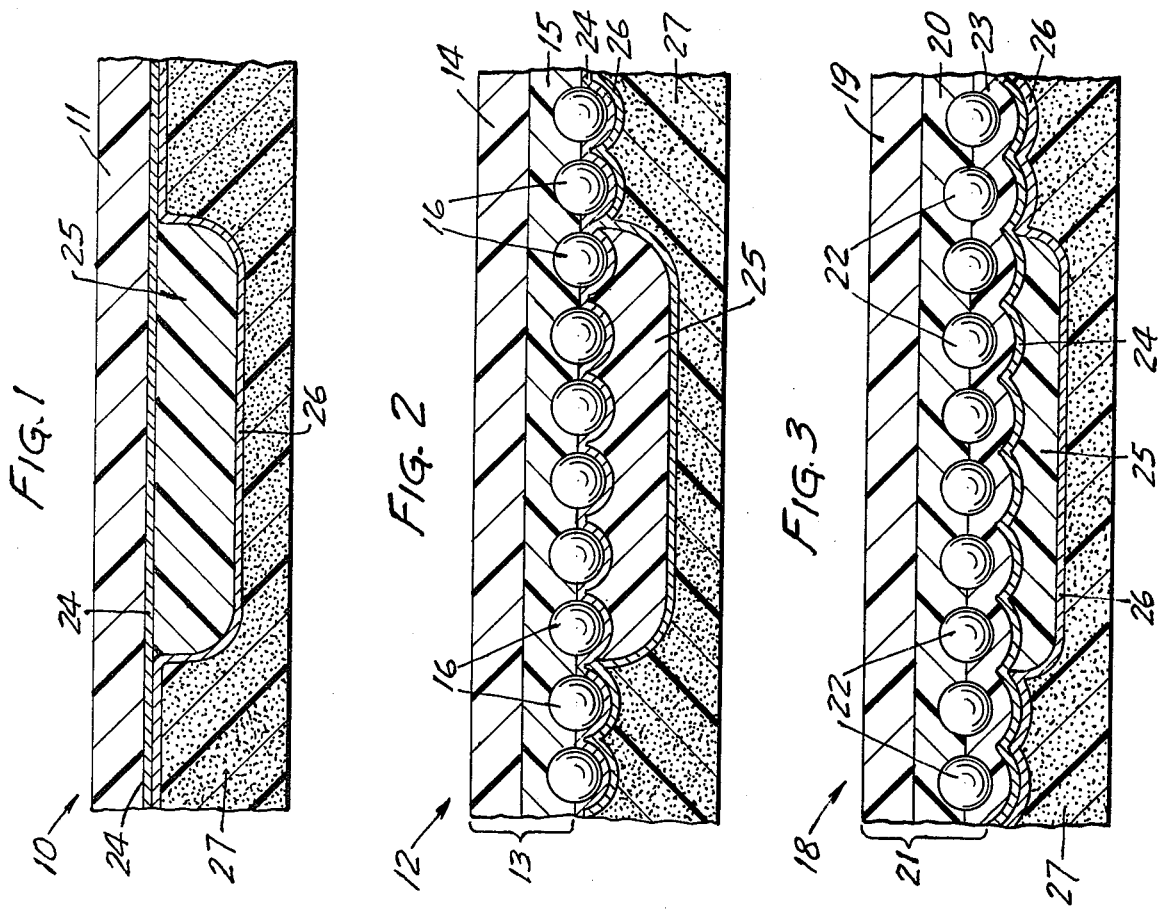
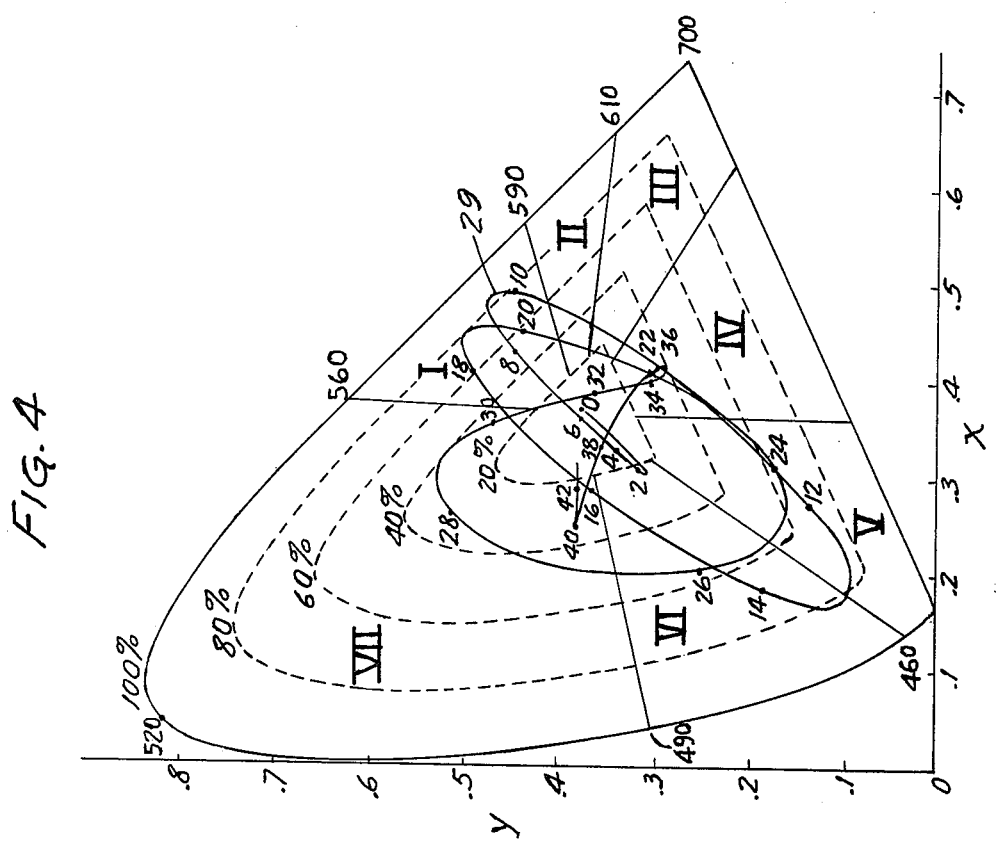

4,099,838

REFLECTIVE SHEET MATERIAL

INTRODUCTION

The present invention builds on technology taught in Sevelin et al, U.S. Pat. No. 3,801,183 for forming transparent "dielectric mirrors" with a pattern, i.e. a legend, that is viewable only under certain viewing conditions. One variety of sheet material taught in Sevelin et al comprises a monolayer of glass microspheres, and a patterned dielectric mirror coated onto the microspheres. This dielectric mirror may be prepared, for example, by first vapor-depositing onto the microspheres an appropriately thin layer (i.e., a layer having an optical thickness--which is the multiplication product of physical thickness and index of refraction--that corresponds to an odd-numbered multiple of about one-quarter wavelength of light in the wavelength range of 3800 to 10,000 angstroms) of a material such as cryolite ($Na_3AlF_6$), which has a refractive index of about 1.37; then printing a legend of transparent ink having an index of refraction of about 1.5 over the cryolite layer; and then vapor-depositing an appropriately thin layer of zinc sulfide, which has an index of refraction of about 2.37, onto the printed ink in the legend areas and onto the cryolite in the background areas.

The resulting dielectric mirror is said to be patterned in that the background and image areas have different reflective efficiency. This difference in reflective efficiency arises because of a greater contrast in index of refraction between the contiguous cryolite and zinc sulfide layers in the background areas than between any of the contiguous layers in the image areas. Under ordinary diffused-light viewing conditions with a sheet material such as described, light is transmitted through the dielectric mirror, generally without revealing any patterned reflectivity; and any graphic image under the sheet material, such as a document to which the sheet material has been adhered, is visible. But under retroreflective viewing conditions, the dielectric mirror reflects a large enough portion of light so that the underlying graphic image is obliterated. Since the dielectric mirror is patterned, i.e. carries a legend or graphic image, the retroreflected light is also patterned, and this patterned retroreflectivity serves as a standard for persons who later review the sheet materials, e.g. to determine the origin or the issue or manufacture date of the sheet material, to check authenticity, etc.

The present invention advances the art of normally "hidden" or latent reflective standards and does it by incorporating into sheet material dielectric mirrors that are not only patterned with areas of differing retroreflective efficiency, but in which the background and image areas of the mirror are also "tuned" to reflect light from different portions of the wavelength spectrum of visible light. That is, the present invention uses dielectric mirrors in which the reflective layers of the mirror have different effective optical thicknesses in the background and image areas, and therefore will reflect, through phase agreement or enhancement, different wavelengths of light. Since the different wavelengths of light carry a different coloration, the color of the reflection in the background areas will be different from the color of the reflection in the image areas.

The color-contrasting reflections not only provide new standards for later review of the sheet materials, but, in addition, the sophistication of the technology needed to achieve such color contrasts increases the difficulty in counterfeiting the sheet materials. Furthermore, the provision of color makes possible the preparation of a sequence of validation materials, e.g. for annual issue, for use as different classes of documents, or for application to different classes of documents.

The ability of dielectric mirrors to produce colored (i.e., non-white) reflection is known in the art, e.g. by applying layers in optical thicknesses that correspond to odd-numbered multiples of one-quarter wavelength of light of the desired color. But the present invention does more than merely provide color; it provides color in a pattern, generally in accordance with the graphic image or legend in the dielectric mirror. For example, either the background or image areas can provide a colored (non-white) reflection, with the other of the background or image area providing white reflection, generally at a different reflective efficiency (for simplicity of description herein the background areas will be described as the areas providing colored reflection). Alternatively, both the background and image areas can provide non-white reflection, but there is a color contrast between the reflections from the two areas; some sheet materials producing such reflections are less preferred as of today, because of a less visibly sharp distinction between the reflections from the two areas.

By "non-white" light it is meant herein light having a spectral excitation purity, or more simply, spectral purity of at least 20 percent; white light is light having a spectral excitation purity of less than 20 percent, and more often less than 10 percent. Preferably the reflection from the background areas of sheet material of the invention will exhibit a spectral purity of at least 40 percent, and more preferably at least 60 percent when the sheeting is illuminated with typical luminaires and viewed either with retroreflected or specularly reflected light. Also, the specular efficiency of the reflection from the image areas will preferably be at least twice the specular efficiency of the reflection from the background areas.

(Sheet materials of the invention are in contrast to sheet material as taught in Baird et al, U.S. Pat. No. 3,858,977, which comprises a many-layer stack of thin transparent layers designed to produce a variation in color depending on the angle of incidence of light on the stack. Most sheet materials of the invention, in contrast to Baird et al, are intended to provide a rather constant color in background or image areas within the range of normal viewing angles. But more than that, the dielectric mirror in sheet material of the invention incorporates the previously noted graphic image, which provides a further variation in reflective characteristics. Further, sheet materials of the invention may be easily and reliably read by persons checking the authenticity of a document, since only one or two colors are usually involved for each document, to thereby assure definite decisions about validity.)

In a greatly preferred construction, the new sheet material of the invention compises briefly, a transparent base substrate, at least an outer stratum of which has an index of refraction $n_b$; a first transparent layer having an index of refraction $n_1$ coated on said stratum of the base sheet; a patterned transparent layer having an index of refraction $n_p$ coated onto said first layer; a second transparent layer coated over said patterned layer and first layer and having an index of refraction of $n_2$; and a third optically thick layer having an index of refraction $n_a$ overlying the second transparent layer. To obtain desired reflective properties, both $n_1$ and $n_2$ are preferably at least 0.1, and more preferably 0.3 or 0.5, unit of refractive index either higher or lower than both $n_b$ and $n_a$; $n_p$ is either higher or lower than both $n_1$ and $n_2$; and the first and second layers have optical thicknesses that, in combination, have a total effective optical thickness that provides a reflection of non-white light when illuminated with white light, but that individually, e.g. in image areas, provide reflection of a differently colored light.

The third layer in the described construction may or may not be transparent. For example, it is often a transparent adhesive layer useful to adhere the sheet material to a document bearing graphic information to be seen through the sheet material. On the other hand, it may be a backing that provides support for a sheet material that is useful by itself rather than by application to some other article; in that case it may be either opaque, as through inclusion of dyes or pigments, or transparent.

To achieve the most intense reflection of white light in the patterned or image areas, the individual optical thickness of at least one of the first and second transparent layers, and preferably both of them, corresponds to an odd-numbered multiple of one-quarter of the wavelength of light in the wavelength range 5000 to 6000 angstroms.

A presently less preferred method for forming a dielectric mirror with background and image areas that differ in effective optical thickness relies on the fact that when vapor is deposited onto a substrate having at least two distinct or different areas made from different materials, the vapor may adhere on those different areas at different rates (called "sticking coefficients"). Thus, in one alternative embodiment of the present invention, a patterned layer that exhibits a first sticking coefficient is deposited onto a base substrate (which may or may not carry a thin transparent layer) that exhibits a second sticking coefficient, and a thin transparent layer is vapor-deposited onto both the areas occupied (image areas) and those not occupied (background areas) by the patterned layer. In the image areas the vapor adheres at a lesser (or faster) rate, with the result that the transparent layer has a lesser (or greater) thickness in the image area than in the background area. This lesser (or greater) thickness tunes the complete dielectric mirror to reflect a different wavelength of light in the image areas than in the background areas. Because thicknesses of vapor-deposited materials are presently more difficult to control with this technique, the technique is less preferred.

The colored reflection provided by the new sheet material of the invention can be either retroreflection (i.e. the base substrate of the sheet material can include a monolayer of microspheres, whereby the sheet material is made retroreflective) or specular reflection (i.e. the base substrate can include dielectric mirrors on a flat or constant-thickness support film, whereby the special reflective properties of the sheeting are obtained through the specular reflection). The latter product is further distinctive over the previously noted Sevelin and Palmquist product by its use of a flat film rather than a beaded substrate, and by its recognition that such a nonlenticular construction, which is inexpensive to make and use, offers validation potential by providing specially viewable specularly reflective images.

DESCRIPTION OF THE DRAWINGS

FIGS. 1–3 are sectional views through illustrative sheet materials of the invention;

FIGS. 4, 6, and 8 are plots on a CIE chromaticity chart of color versus the optical thickness of the first and second thin transparent layers noted above in representative sheet materials of the invention.

DETAILED DESCRIPTION

Figure 7:
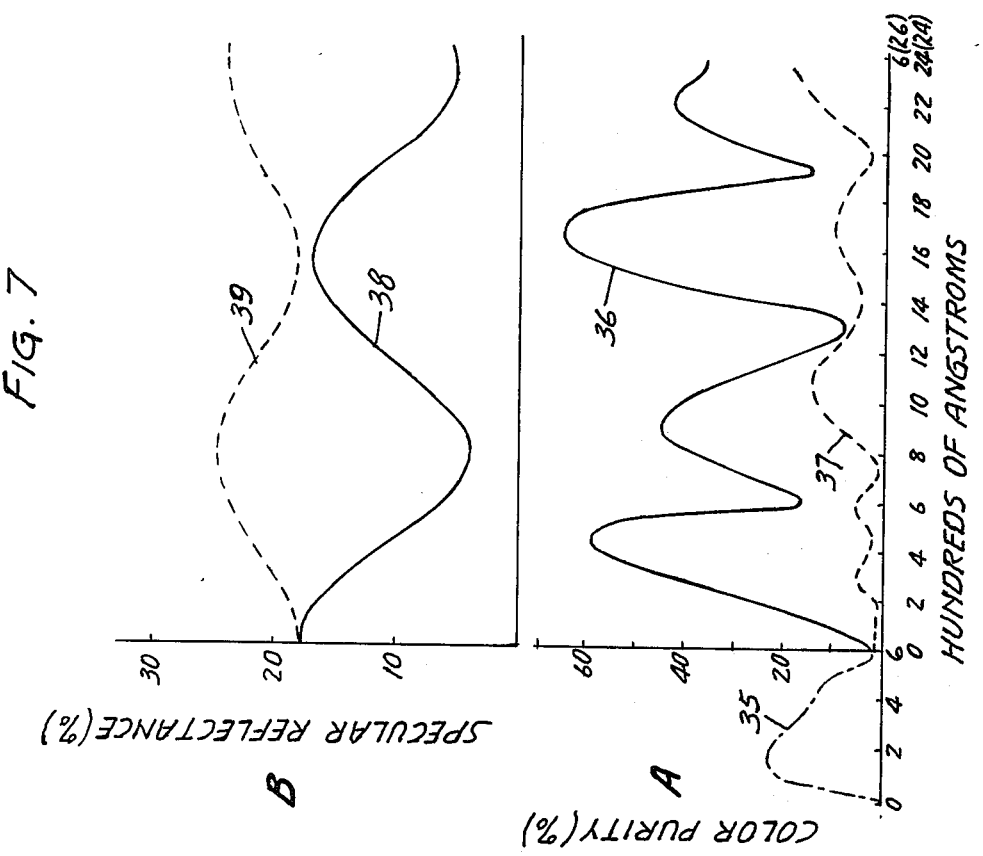
FIGS. 5 and 7 are plots of spectral purity (Part A) or specular efficiency (Part B) versus variation of the optical thickness of the first thin transparent layer of the representative sheet materials reported on in FIGS. 4 and 6, assuming the second layer has a constant thickness of 600 angstroms.

The illustrative sheet materials of the invention 10, 12, and 18 shown in FIGS. 1–3 include different kinds of base substrates. The sheet material 10 in FIG. 1 uses a flat transparent polymeric film 11 as the base substrate, while the sheet materials 12 and 18 in FIGS. 2 and 3 use beaded sheetings 13 and 21, respectively. Sheeting 13 comprises a support film 14, a layer of binder material 15, and a monolayer of transparent microspheres 16. In sheet materials of the invention such as the sheet material 12 shown in FIG. 2, the support film 14 and binder material 15 are most often only temporary components of the sheet material and are removed at a later stage, such as after application of the sheet material to a document, to prepare an "exposed-lens" sheet material (see Example 1 of Sevelin et al, U.S. Pat. No. 3,801,183); once the support film 14 and binder material 15 are removed, the glass microspheres comprise the whole base substrate in sheet material of the invention.

In sheet material 18 in FIG. 3, the support film 19 and binder material 20 of the beaded sheeting 21 are permanent components and provide a flat-surfaced sheeting having desired retroreflective characteristics even if wet. In order to position the dielectric mirror at the approximate focal point of the microspheres 22 in sheet material such as 18, a transparent spacing layer 23 is normally applied over the microspheres before application of the dielectric mirror.

As may be seen, the stratum of the base substrate referred to above as having a refractive index $n_b$ is the whole film 11 in the sheet material 10, the layer of microspheres 16 in the sheet material 12, and the spacing layer 23 in the sheet material 18. More intensely colored reflection is generally obtained with lower values of $n_b$, and thus use of a spacing layer 23, which will conveniently have a refractive index of 1.5 instead of the more typical 1.9 index of microspheres is preferred.

Each of the sheet materials 10, 12, and 18 includes a first thin transparent layer 24 of refractive index $n_1$ coated on the base substrate, a patterned transparent layer 25 of refractive index $n_p$ coated onto the first thin layer, a second thin transparent layer 26 of refractive index $n_2$ coated over the patterned layer, and an adhesive layer 27 of refractive index $n_a$ by which the sheet material can be adhered to an identification card, credit card, validation sticker, driver's license or other document to be validated. The transparent layers 24, 25 and 26 in their position between a base substrate and third optically thick layer 27 having, respectively, refractive indices $n_b$ and $n_a$ that are both either higher or lower than both the refractive indices $n_1$ and $n_2$, function in combination as a dielectric mirror, transmitting a portion of light but also reflecting a portion of light.

Preferably the two layers 24 and 26 have the same index of refraction, because at least with optimum materials (that is, those with high refractive indices) the highest spectral purity values (most intense color) have been obtained under that condition. Even where the materials of the two layers 24 and 26 are different, their refractive indices preferably differ by not more than about 0.4 unit. As noted, the index of refraction of the layers 24 and 26 is preferably rather high, such as about 2 or higher, because the color of reflected light will change less as the viewing angle is changed when such high-index materials are used.

When the material of the layers 24 and 26 is the same, the optical thicknesses of the two layers can generally be directly added to arrive at an overall or effective optical thickness, and the coloration of reflected light in the background areas will depend on that overall optical thickness. FIG. 4 shows the variation in color which occurs when the two layers 24 and 26 in FIGS. 1–3 are both zinc sulfide (having a refractive index of 2.36); $n_a$ and $n_b$ are 1.50 and 1.63, respectively; and the total thickness of the layers is varied (where refractive indices are specified herein, they refer to the index of refraction for light having a wavelength of 5500 angstroms). The results reported in FIG. 4 were obtained by assuming illumination of the sample by cool white fluorescent light, and calculating the CIE color coordinates using optical interference film theory as given by O. S. Heavens, *Optical Properties of Thin Films*, Dover Publications, New York, N.Y. 1965 and CIE color matching functions, as given on pages 270 and 315 of Wyszecki and Stiles, *Color Science*, New York, 1967, for example. (In general, when colored reflected characteristics are reported herein, they are with reference to reflections obtained from a sample illuminated with such white light.) The total physical thickness of the layers 24 and 26 is plotted in 100's of angstroms as noted by the numerals along the color line 29 on the chart. The x and y color coordinates are plotted on the abscissa and ordinate of the chart, respectively. The chart is divided into sectors of different color: Sector I is yellow; II, orange; III, red; IV, pink; V, violet; VI, blue; and VII, green. The percentage lines on the chart are values of spectral purity. Within the 20-percent line is the generally white sector. The center of the white sector is at the color coordinates of the cool white fluorescent light.

When the total thickness of the layers is 1000 angstroms (the point 10 on color line 29), the color of the reflection in the background areas will be yellow at a spectral purity of nearly 80 percent. By extrapolating along the color line 29 from point 8 to point 10, it is seen that the most intense yellow color (the highest spectral purity) is achieved when the total physical thickness of the layers is about 950 angstroms. Other peaks or maxima of yellow color occur when the total physical thickness of the layers 24 and 26 is about 1900 and 2900 angstroms, respectively. The peak occuring at about 950 angstroms is called the firstorder yellow maximum, the peak at 1900 angstroms is the secondorder maximum, etc. The first-order maximum for yellowcolored light occurs when the overall optical thickness of the layers 24 and 26 (i.e. the optical thickness of layer 24 plus the optical thickness of layer 26) corresponds to nearly three-eights wavelength of yellow-colored light (rather than the expected one-quarter wavelength, because of the subjective nature of the eye's response to colors); the second-order maximum corresponds to three-quarter wavelength of yellow-colored light, etc. Blue maxima are seen to occur at thicknesses of about 150 (one-twelfth wavelength of blue light), 1300 (about three-quarter wavelength) and 2400 (nearly five-quarters) angstroms, respectively.

Figure 5:
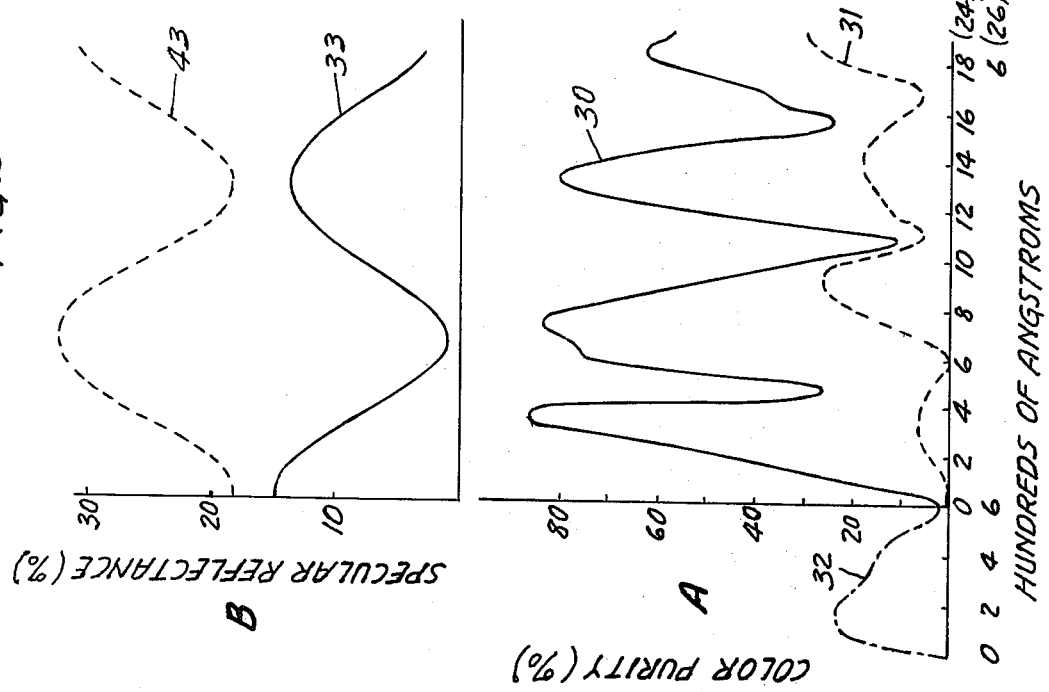

FIG. 5 shows characteristics of the same product illustrated in FIG. 4. Part A shows the variation in color of reflection with variation in thickness of the first layer 24, assuming the second layer 26 is fixed at 600 angstroms, and assuming $n_p$ is 1.5. Spectral purity is plotted in percent on the ordinate and thickness in hundreds of angstroms on the abscissa. The spectral purity of reflection in the background area is represented by the continuous line 30 and in the image area by the dotted line 31 (the broken-line extension 32 of the plot 30 in FIG. A shows the color of reflection in the background if the thickness of the first layer is 0 and the thickness of the second layer is varied from 0 to 600 angstroms). The specular efficiency of reflections from the sample is plotted in Part B of FIG. 5; the specular efficiency is plotted in percent on the ordinate in Part B, while the abscissa of Part B is the same as for Part A. The specular reflection for the background areas is shown by the solid line 33 and for the image areas by the dotted line 43.

Figure 6:
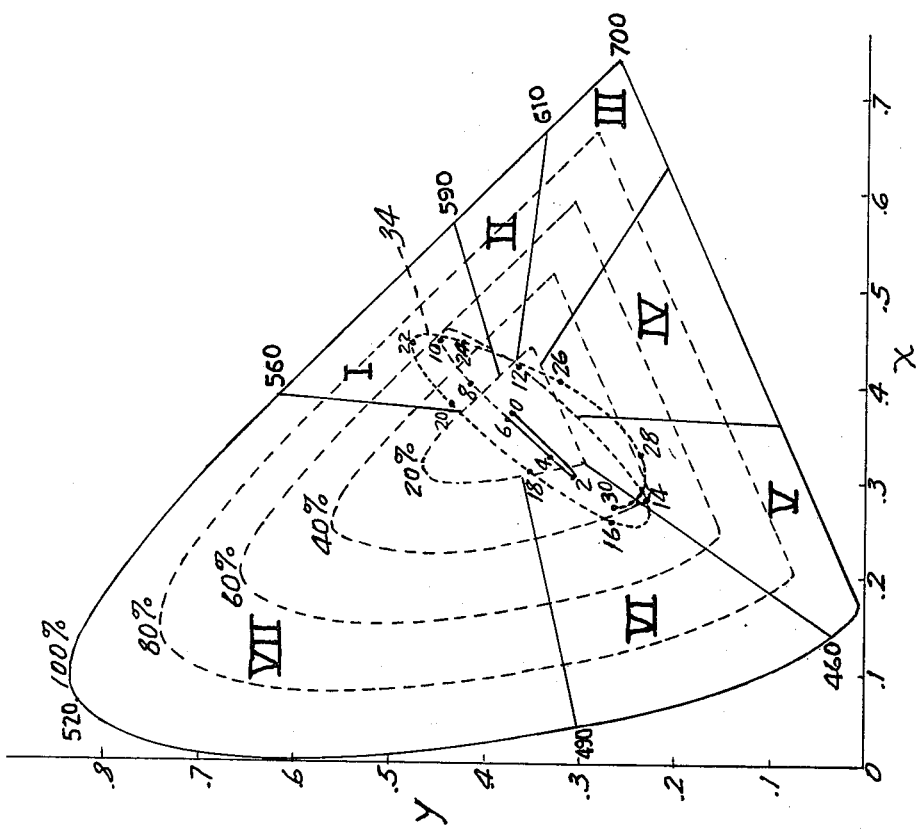

If the two layers 24 and 26 are of different materials, then the percentage of light that is reflected at the interface between the two layers will increase and the color of reflected light will vary in a different pattern. FIG. 6 is a plot like FIG. 4 of color versus physical thickness of the two layers 24 and 26 when those layers are respectively silicon monoxide (refractive index 1.96) and zinc sulfide, and $n_b$ and $n_a$ are both equal to 1.50. Values for FIG. 6 are calculated by calculating the specular reflectance of each wavelength of light using three-interface formulas, using the three non-zero Fresnel reflection coefficients, and these numbers are inserted into a color coordinate and total reflectance calculating program developed according to the previously cited *Heavens* and *Wyszecki and Stiles* references. The effective optical thickness of the layers 24 and 26, when the layers comprise different materials, is the optical thickness of a single layer that would produce the same order of color of reflection as the combined layers produce.

The solid portion of the color line 34 in FIG. 6 occurs when layer 24 is assumed to have a value of 0 thickness and the thickness of the layer 26 (zinc sulfide) is varied from 0 to 600 angstroms. The dotted portion of color line 34 is calculated assuming the thickness of the layer 26 is 600 angstroms and the thickness of the layer 24 (silicon monoxide) is varied from 0 to 2400 angstroms. Numbers along the color line are in hundreds of angstroms; the numbers varying from 0 to 6 along the dotted portion and from 6 to 30 along the solid portion to reflect the combined thickness of the layers 24 and 26.

FIG. 7 is a plot like FIG. 5, with the thickness of the layer 24 and 26 being plotted along the abscissa. As shown, the layer 26 varies from 0 to 600 angstroms over the broken-line portion 35 of the plot and then remains constant over the solid-line portion 36, while the layer 24 is shown as 0 over the broken-line portion 35 and then varies from 0 to 2400 angstroms over the solid-line portion 36. Lines 35 and 36 are for reflectance from the background area and dotted line 37 is for reflectance from the image area. Specular reflectance is plotted on Part B of the graph, and the abscissa is the same for Part B as for Part A; solid line 38 shows reflection in the background and dotted line 39 is for the image area.

Figure 8:
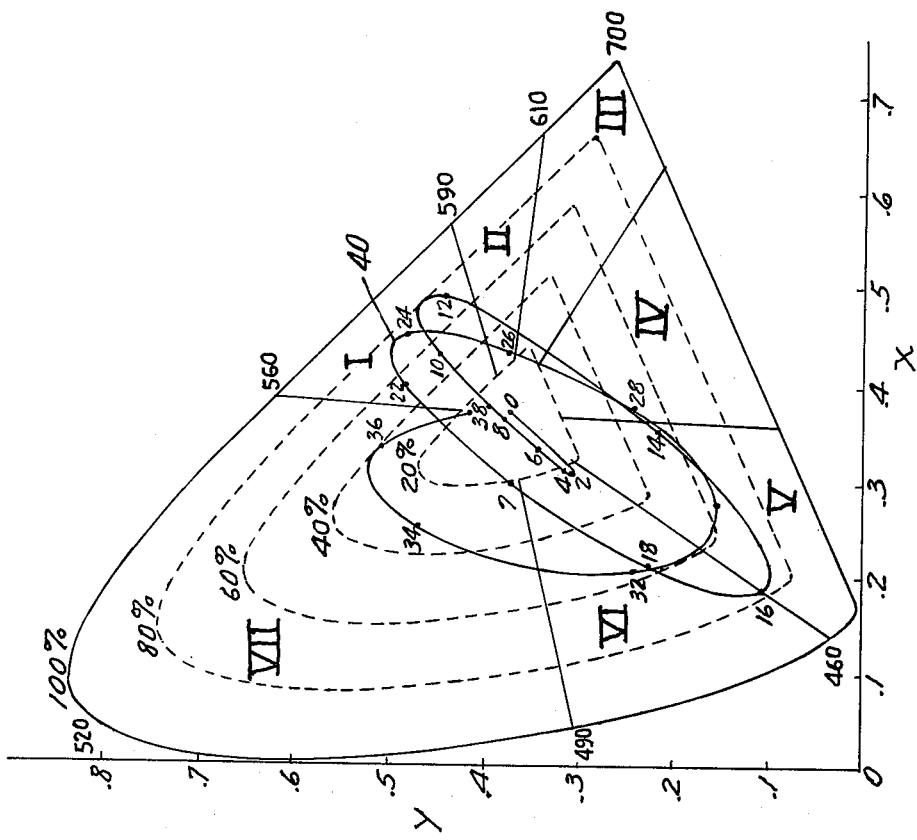

FIG. 8 is a plot like FIG. 4 of color of reflection versus physical thickness of the two layers 24 and 26 when those layers are both silicon monoxide, and $n_a$ and $n_b$ are 1.50 and 1.63, respectively. As may be seen from the color line 40, the color of the reflection from the product represented in FIG. 8 is almost as intense (or spectrally pure) as that for the product of FIG. 4. A comparison of FIGS. 4, 6, and 8 shows that color of reflection is generally most intense when the two layers 24 and 26 are the same material; either zinc sulfide or silicon monoxide produces good color when used as the material of both layers 24 and 26, but when one layer is silicon monoxide and the other zinc sulfide, color is somewhat less intense.

In order to maximize the reflection in areas occupied by the patterned layer 25, the patterned layer should have an index of refraction $n_p$ substantially different from the index of refraction of the two layers 24 and 26. The index of refraction $n_p$ should be higher than both $n_1$ and $n_2$ when $n_b$ and $n_a$ are higher than $n_1$ and $n_2$; and $n_p$ should be lower than $n_1$ and $n_2$ when $n_b$ and $n_a$ are lower than $n_1$ and $n_2$. Desirably there is a difference of at least about 0.4 unit of refractive index between $n_p$ and either $n_1$ or $n_2$. Also, to maximize reflection of white light in the patterned areas, at least one of the layers 24 and 26, and preferably both of them, should have optical thicknesses that correspond to an odd-numbered multiple of light within the wavelength band 5000 and 6000 angstroms. But at the same time, the combined effective optical thickness of the layers 24 and 26 will produce the desired color in the background areas.

Materials for use as the layers 24 and 26 are well known and include zinc sulfide, silicon monoxide, bismuth oxide, zinc oxide, titanium oxide, cryolite, and elastomeric copolymers of perfluoropropylene and vinylidene fluoride (refractive index of about 1.38). Typical useful materials for the layer 25 are alkyds, acrylics, and polyesters. The adhesive layer 27 can comprise known pressure-sensitive adhesives, but preferably comprises heat- or solvent-activated adhesives. The adhesive should develop a strong bond of adhesion to a document so as to prevent removal of the sheet material from the document without disrupting the dielectric mirror in the sheet material. Thus, disruption caused by attempted removal of the sheet material will reveal tampering or transfer of the sheet material. Instead of, or in addition to, an adhesive layer 27 positioned at the "bottom" of the sheet material, an adhesive layer on the "front" of the sheet material, i.e. on the side of the first transparent layer opposite from the second transparent layer, may be used.

General procedures for preparing microspherecontaining base sheet materials useful in the invention and for applying dielectric mirrors are taught in Sevelin et al, U.S. Pat. No. 3,801,183 and Bingham, U.S. Pat. No. 3,700,305, which are incorporated herein by reference. The thin transparent layers 24 and 26 are typically applied by vapor-coating procedures, while the layer 25 is typically applied by roll-coating or other printing techniques.

Documents carrying sheet materials as shown in FIG. 1 are generally examined in an open room or other open area, in which a source of illumination is spaced some distance from the document. The color of the sheet material develops through specular reflection. Thus, to check a document's authenticity, the document will be tilted with respect to a particular light source until light from the source is specularly reflected by the layers 24 and 26 of transparent material in the document. Under such conditions, the angle between the viewer's eye and the document will be equal to the angle between the light source and the document; that is, the angle of incidence (as measured from a line perpendicular to the plane of the document) will equal the angle of reflection. The most intense color will be seen by illuminating the sample under conditions that maximize the percentage that specular reflection from the sheet material constitutes of all the light entering a viewer's eye or a measuring instrument.

Samples as shown in FIGS. 2 and 3 should generally be examined for verification under retroreflective viewing conditions. Since retroreflected light returns to the viewer along about the same path as it traveled to the reflector, the viewer's eye should be near the axis at which light is projected onto the card. Special viewers for viewing such sheet materials are taught in Johnson, U.S. Pat. No. 3,767,291 and 3,832,038. The color of light reflected from the background areas of sheet materials as shown in FIGS. 2 and 3 is often perceived to be brighter than with sheet materials as taught in FIG. 1 because less extraneous light enters the eye when a sample is viewed through a retroreflective viewer than when a specular sample is viewed in an open area. However, the colors developed by preferred sheeting of the invention shown in FIG. 1 are sufficiently bright that they can be determined in a typically illuminated room without a special viewer.

As previously noted, the sheet materials of the invention may be transparent, by which it is meant that when they are applied to a substrate carrying a graphic image it is possible to read the graphic image through the sheet material under ordinary diffused-light viewing conditions. However, when a sheet material such as shown in FIGS. 2 or 3 is viewed under retroreflective viewing conditions, the graphic images underlying the sheet material will typically be obliterated to the viewer.

What is claimed is:

1. Sheet material comprising a transparent base substrate, a transparent dielectric mirror coated on said substrate, and an optically thick layer overlying said mirror; said mirror including background and image areas which have different effective optical thicknesses that tune said areas to reflect light from different portions of the visible spectrum of light, whereby there is a color contrast between the reflections from the background and image area; the reflection from at least one of said background and image areas having a spectral purity of at least about 40 percent.

2. Sheet material of claim 1 in which the reflection from the other of said background and image areas has a spectral purity of less than about 20 percent.

3. Sheet material of claim 1 in which the reflection from one of said background and image areas has a spectral purity of at least about 60 percent and the reflection from the other of said background and image areas has a spectral purity of less than about 20 percent.

4. Sheet material of claim 3 in which the specular efficiency of reflection from said other area is at least twice that from said one area.

5. Sheet material of claim 1 in which said base substrate comprises a transparent flat film.

6. Sheet material of claim 1 in which said base substrate comprises a dense monolayer of transparent microspheres.

7. Sheet material of claim 6 in which a transparent spacing layer is coated over said monolayer of microspheres, and the dielectric mirror is coated on said spacing layer.

8. Sheet material comprising a transparent base substrate, at least an outer stratum of which has a refractive index $n_b$; a dielectric mirror comprising a first transparent layer of refractive index $n_1$ coated on said stratum of the base substrate; a patterned transparent layer of refractive index $n_p$ coated onto said first layer; and a second transparent layer of refractive index $n_2$ coated over said first and patterned layers; both $n_1$ and $n_2$ being higher or lower than both $n_b$ and $n_p$; the first and second layers having optical thicknesses that tune the reflection from the areas of the dielectric mirror not occupied by the patterned layer to a reflection of non-white light when the sheet material is illuminated with white light, said nonwhite reflection contrasting in color with the reflection from the areas of the mirror occupied by the patterned layer.

9. Sheet material of claim 8 which includes a third optically thick transparent layer of refractive index $n_a$ coated over the second transparent $n_1$ and $n_2$ being either higher or lower than each of $n_a$, $n_b$, and $n_p$.

10. Sheet material of claim 9 in which said third layer is an adhesive layer for attaching the sheet material to a document to be validated.

11. In combination, sheet material of claim 8 adhered to a document to be authenticated.

12. Sheet material of claim 8 in which said base substrate comprises a transparent flat film.

13. Sheet material of claim 8 in which said base substrate comprises a dense monolayer of transparent microspheres.

14. Sheet material of claim 13 in which said outer stratum is a transparent spacing layer coated over said monolayer of microspheres.

15. Sheet material of claim 8 in which said first and second transparent layers comprise the same material.

16. Sheet material of claim 8 in which the reflection from the areas occupied only by said first and second layers has a spectral purity of at least 40 percent when the sheet material is viewed under retroreflective or specular viewing conditions.

17. Sheet material of claim 8 in which the reflection from the areas occupied by said patterned layer has a spectral purity of less than about 20 percent.

18. Sheet material of claim 8 in which the reflection from the areas occupied only by said first and second layers has a spectral purity of at least about 60 percent and the spectral purity of the reflection from the areas occupied by said patterned layer has a spectral purity of less than about 20 percent.

19. Sheet material of claim 8 in which the specular efficiency of reflection from the areas occupied by said patterned layer is twice the specular efficiency of reflection from the areas occupied only by said first and second layers.

20. Sheet material of claim 8 in which the individual optical thickness of at least one of said first and second transparent layers corresponds to an odd-numbered multiple of light in the wavelength range of about 5000 to 6000 angstroms.

21. Sheet material comprising a transparent base substrate, at least an outer stratum of which has an index of refraction $n_b$; a dielectric mirror comprising a first transparent layer of refractive index $n_1$ coated on said stratum of the base substrate; a patterned transparent layer of refractive index $n_p$ coated onto said first layer; a second transparent layer of refractive index $n_1$ coated over said first and patterned layers; and a third optically thick transparent layer of refractive index $n_a$ coated over the second transparent layer; $n_1$ being either higher or lower than each of $n_a$, $n_b$, and $n_p$; the first and second layers having optical thicknesses that tune the reflection from the areas of the dielectric mirror not occupied by the patterned layer to a reflection of non-white light when the sheet material is illuminated with white light, said non-white reflection contrasting in color with the reflection from the areas of the mirror occupied by the patterned layer.

22. Sheet material of claim 21 in which said base substrate comprises a transparent flat film.

23. Sheet material of claim 21 in which said base substrate comprises a dense monolayer of transparent microspheres.

24. Sheet material of claim 21 in which the reflection from the areas occupied only by said first and second layers has a spectral purity of at least 60 percent.

25. Sheet material of claim 24 in which the reflection from areas occupied by said patterned layer has a spectral purity of less than about 20 percent.

26. Sheet material of claim 21 in which the individual optical thickness of at least one of said first and second transparent layers corresponds to an odd-numbered multiple of light in the wavelength range of about 5000 to 6000 angstroms.

27. Sheet material of claim 21 which carries, on a surface of the sheet material that is disposed on the opposite side of said first transparent layer from said second transparent layer, a layer of adhesive for attaching the sheet material to a substrate.

* * * * *